(12) United States Patent
Zhou et al.

(10) Patent No.: US 10,016,103 B2
(45) Date of Patent: Jul. 10, 2018

(54) AIR-RELEASING VALVE FOR USE IN SUCTION APPARATUS AND SUCTION ROBOT HAVING THE AIR-RELEASING VALVE

(71) Applicant: Ecovacs Robotics Co., Ltd., Suzhou, Jiangsu Province (CN)

(72) Inventors: Fei Zhou, Suzhou (CN); Xiaoming Lv, Suzhou (CN); Linqiang Feng, Suzhou (CN)

(73) Assignee: Ecovacs Robotics Co., Ltd., Jiangsu (CN)

( * ) Notice: Subject to any disclaimer, the term of this patent is extended or adjusted under 35 U.S.C. 154(b) by 24 days.

(21) Appl. No.: 15/127,005

(22) PCT Filed: Mar. 17, 2015

(86) PCT No.: PCT/CN2015/074388
§ 371 (c)(1),
(2) Date: Dec. 15, 2016

(87) PCT Pub. No.: WO2015/139614
PCT Pub. Date: Sep. 24, 2015

(65) Prior Publication Data
US 2017/0095128 A1    Apr. 6, 2017

(30) Foreign Application Priority Data

Mar. 17, 2014   (CN) .......................... 2014 1 0097748

(51) Int. Cl.
*A47L 1/02* (2006.01)
(52) U.S. Cl.
CPC ...................................... *A47L 1/02* (2013.01)
(58) Field of Classification Search
CPC ........ A47L 1/02; A47L 11/38; A47L 2201/00; B08B 1/006
See application file for complete search history.

(56) References Cited

U.S. PATENT DOCUMENTS

| | | | |
|---|---|---|---|
| 4,025,984 A | * | 5/1977 | Hoener, Jr. ............... A47L 1/02 15/302 |
| 5,263,760 A | | 11/1993 | Sohol |

(Continued)

FOREIGN PATENT DOCUMENTS

| | | |
|---|---|---|
| CN | 2095296 U | 2/1992 |
| CN | 201029846 Y | 3/2008 |

(Continued)

OTHER PUBLICATIONS

Chinese Office Action dated Dec. 29, 2016 in connection with Chinese Patent Appl. No. 201410097748.8.

(Continued)

*Primary Examiner* — Dung Van Nguyen
(74) *Attorney, Agent, or Firm* — Berliner & Associates

(57) ABSTRACT

An air-releasing valve for use in a suction apparatus and a suction robot having the air-releasing valve are provided. The air-releasing valve comprises an activation unit and an air-releasing valve retaining base (3). An air-releasing hole (11) in communication with a negative pressure chamber (18) of the suction apparatus is provided on the air-releasing valve retaining base (3). The activation unit is provided on the air-releasing valve retaining base (3) and is movable relative to the air-releasing valve retaining base (3) to open the air-releasing hole (11). A switch (4) is provided on the air-releasing valve retaining base (3). The activation unit opens the air-releasing hole (11) and triggers the switch (4) to shut off a vacuuming apparatus (14) of the suction apparatus simultaneously. The air-releasing valve is capable of rapidly releasing air from the suction apparatus and shutting off the vacuuming apparatus (14) in a timely manner.

13 Claims, 4 Drawing Sheets

(56) References Cited

U.S. PATENT DOCUMENTS

| | | | | |
|---|---|---|---|---|
| 5,592,998 A * | 1/1997 | Urakami | ............ | B62D 57/00 |
| | | | | 180/164 |
| 5,715,557 A * | 2/1998 | Hsu | ............ | A47L 1/02 |
| | | | | 15/103 |
| 5,839,532 A * | 11/1998 | Yoshiji | ............ | B62D 57/00 |
| | | | | 114/222 |
| 6,090,221 A * | 7/2000 | Gan | ............ | A47L 1/02 |
| | | | | 134/172 |
| 9,427,121 B2 * | 8/2016 | Lv | ............ | A47L 1/02 |
| 2006/0048800 A1 * | 3/2006 | Rast | ............ | A47L 1/02 |
| | | | | 134/56 R |

FOREIGN PATENT DOCUMENTS

| | | |
|---|---|---|
| CN | 101402379 A | 4/2009 |
| CN | 201305050 Y | 9/2009 |
| CN | 102011787 A | 4/2011 |
| CN | 202028256 U | 11/2011 |
| CN | 202908616 U | 5/2013 |
| CN | 203809795 U | 9/2014 |
| JP | H10248760 A | 9/1998 |
| KR | 20060088826 A | 8/2006 |
| WO | 2008/096974 A1 | 8/2008 |
| WO | WO2012063710 A1 | 5/2012 |
| WO | 2014/032586 A1 | 3/2014 |

OTHER PUBLICATIONS

Chinese Office Action dated Jan. 26, 2018 in connection with Chinese Patent Appl. No. 201410097748.8.
European Search Report dated Mar. 5, 2018 issued in connection with related European Appl. No. 15765783.4.

* cited by examiner

A-A

B-B

AIR-RELEASING VALVE FOR USE IN SUCTION APPARATUS AND SUCTION ROBOT HAVING THE AIR-RELEASING VALVE

FIELD OF THE INVENTION

The present invention relates to an air-releasing valve and in particular to an air-releasing valve for a suction robot, which belongs to the technical field of small home appliances.

BACKGROUND ART

With the advent of suction robots such as window cleaning robot, window cleaning work becomes more easy and simple. Nowadays, the window cleaning robots available in the market mostly allow the robots to be adsorbed on windows in a vacuum adsorption manner. In order to prevent the robots from falling, the adsorption force on the windows is relatively large. Thus, in order to take off the robots from the windows, it takes a relatively long time to release air from the suction cup. In the existing robots, the vacuuming apparatus is still in operation at the time of air release. Accordingly, the air release speed of the suction cup is impaired, and also waste of energy occurs.

SUMMARY OF THE INVENTION

In view of the above deficiencies in the prior art, the present invention provides a novel suction robot air-releasing valve and a suction robot equipped with such an air-releasing valve. The air-releasing valve can shut off the vacuuming apparatus when releasing air, so as to release air from the suction cup quickly.

The technical problem to be solved in the present invention is solved by the following technical solutions.

An air-releasing valve for a suction apparatus comprises an activation unit and an air-releasing valve retaining base. An air-releasing hole in communication with a negative pressure chamber of the suction apparatus is provided on the air-releasing valve retaining base. The activation unit is provided on the air-releasing valve retaining base and is movable relative to the air-releasing valve retaining base so as to open or close the air-releasing hole. A switch is further provided on the air-releasing valve retaining base. When air release is needed, the activation unit moves relative to the air-releasing valve retaining base under an external force so that it opens the air-releasing hole and triggers the switch to shut off a vacuuming apparatus of the suction apparatus simultaneously.

The air-releasing valve further comprises a switch cap connected with the activation unit. A switch spring is provided between the switch and the switch cap. The activation unit triggers the switch via the switch cap so as to shut off the vacuuming apparatus of the suction apparatus.

The switch is a sensing switch, which transmits a switching signal to a control unit of the suction apparatus to shut off the vacuuming apparatus when the air-releasing valve releases air.

The sensing switch is a limit switch, a Hall switch, or a pressure sensing switch.

The switch also may be a cut-out switch, which cuts off an electric current of the vacuuming apparatus when the activation unit is pulled up for air release.

In the embodiment of the present invention, the activation unit comprises an air-releasing valve pull ring, an air-releasing valve pull ring insert and an air-releasing valve holder. The air-releasing valve pull ring is connected with the air-releasing valve holder via the air-releasing valve pull ring insert which is detachable, and the air-releasing valve holder is connected with the switch cap.

An air-releasing valve spring is provided between the switch cap and the air-releasing valve retaining base.

Preferably, the air-releasing valve holder has on the top thereof an outer edge which extends downward to form a guide pillar corresponding to the air-releasing hole. The diameter of the guide pillar is smaller than that of the air-releasing hole. A sealing gasket is provided on the outer edge. The air-releasing valve holder engages with the air-releasing valve retaining base, and they abut against each other under the action of the air-releasing valve spring.

A gas guiding joint in communication with the air-releasing hole is provided on the air-releasing valve retaining base, and the gas guiding joint is connected with the negative pressure chamber via a hose.

A suction robot comprises a control unit, a driving unit, a suction unit and a walking unit. The control unit is connected with the driving unit, the driving unit drives the walking unit and the suction unit comprises a suction cup and a vacuuming apparatus. The vacuuming apparatus is connected with the control unit. The vacuuming apparatus pumps air out of the suction cup to form a negative pressure so that the suction robot is adsorbed on a working surface. Further, the suction robot comprises the above air-releasing valve connected with the suction cup, and the switch is connected with the control unit. When releasing air, the air-releasing valve triggers the switch to transmit a signal to the control unit so as to shut off the vacuuming apparatus.

The present invention also provides an air-releasing valve for a suction apparatus, comprising an activation unit and an air-releasing unit. The air-releasing unit has an air-releasing hole in communication with a negative pressure chamber of the suction apparatus. When air release is needed, by the activation unit, the air-releasing hole is opened for air release and a vacuuming apparatus of the suction apparatus is shut off simultaneously.

The present invention also provides a suction robot comprising a control unit, a driving unit, a suction unit and a walking unit. The control unit is connected with the driving unit. The driving unit drives the walking unit. The suction unit comprises a suction cup and a vacuuming apparatus. The vacuuming apparatus is connected with the control unit. The vacuuming apparatus is connected with the control unit. The vacuuming apparatus pumps air out of the suction cup to form a negative pressure chamber so that the suction robot is adsorbed on a working surface. The suction robot further comprises the above air-releasing valve connected with the suction cup, and the control unit is connected with the activation unit.

In conclusion, the air-releasing valve of the present invention can quickly release air from the machine so that the machine can be easily taken off from the windows. At the same time, the air-releasing valve can shut off the vacuuming apparatus of the machine in a timely manner. Thus, the air-releasing valve is easy to operate.

DESCRIPTION OF ATTACHED DRAWINGS

DETAILED DESCRIPTION OF PREFERRED EMBODIMENTS

Hereinafter, one specific embodiment of the suction robot air-releasing valve of the present invention will be described in detail in conjunction with the drawings.

The present invention provides an air-releasing valve for a suction apparatus. The air-releasing valve comprises an activation unit and an air-releasing valve retaining base. An air-releasing hole in communication with a negative pressure chamber of the suction apparatus is provided on the air-releasing valve retaining base. The activation unit is provided on the air-releasing valve retaining base and is moveable relative to the air-releasing valve retaining base so as to open or close the air-releasing hole. A switch is further provided on the air-releasing valve retaining base, and when air release is needed, the activation unit moves relative to the air-releasing valve retaining base under an external force so that it simultaneously opens the air-releasing hole and triggers the switch to shut off a vacuuming apparatus of the suction apparatus.

Figure 1:
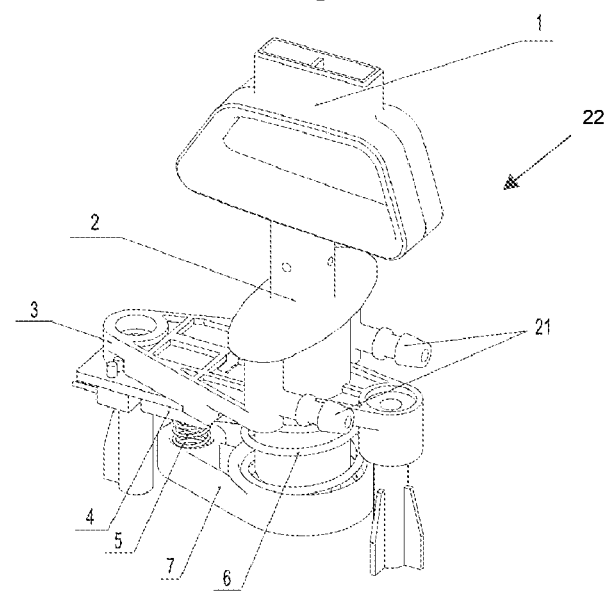
FIG. 1 is a schematic perspective view of one embodiment of an air-releasing valve of the present invention.
Figure 2:
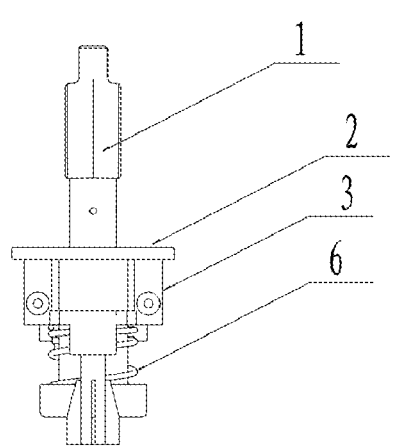
FIG. 2 is a main view of the air-releasing valve shown in FIG. 1.
Figure 3:
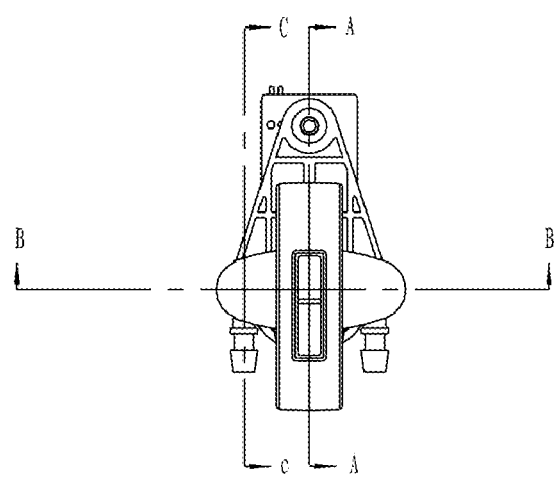
FIG. 3 is a top view of the air-releasing valve shown in FIG. 1.

FIG. 1 is a schematic perspective view of one embodiment of an air-releasing valve of the present invention, FIG. 2 is a main view of the air-releasing valve shown in FIG. 1, and FIG. 3 is a top view of the air-releasing valve shown in FIG. 1.

As shown in FIGS. 1, 2 and 3 in combination, in this embodiment, to be specific, a suction apparatus provides an adsorption force that allows a suction robot to be adsorbed on a working surface. An air-releasing valve for the suction apparatus comprises an air-releasing valve pull ring 1, an air-releasing valve holder 2, an air-releasing valve retaining base 3, a switch 4, a switch spring 5, an air-releasing valve spring 6 and a switch cap 7. The air-releasing valve pull ring 1, the air-releasing valve holder 2 and an air-releasing valve pull ring insert 8 which will be described later form said activation unit 22. The switch 4 is a pressure sensing switch, which is installed on the air-releasing valve retaining base 3 and is connected with a control unit 26 (not shown) of the suction robot. The switch spring 5 and the air-releasing valve spring 6 are located between the air-releasing valve retaining base 3 and the switch cap 7. The switch spring 5 is a compression spring, and when being deformed forcibly to a certain extent, triggers the switch 4 which in turn generates and transmits a switching signal to the control unit.

Figure 4:
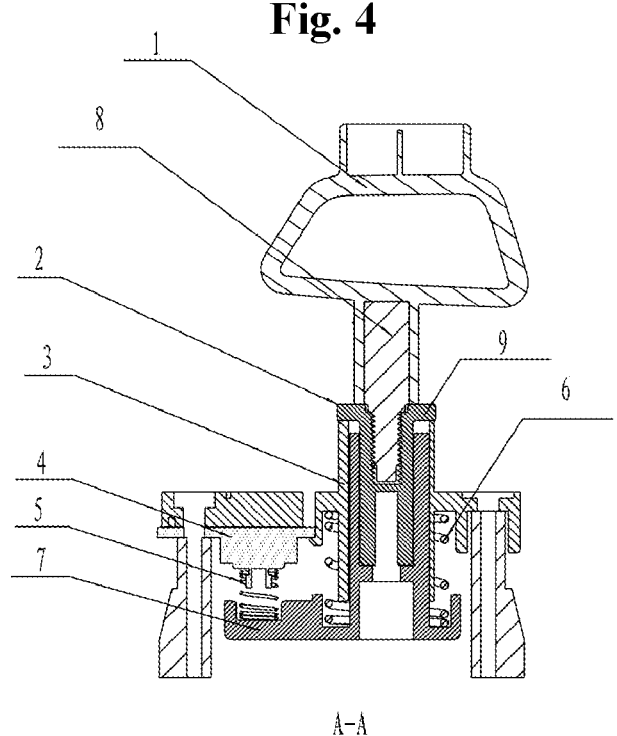
FIG. 4 is a schematic cross-sectional view along line A-A of the air-releasing valve shown in FIG. 3.
Figure 5:
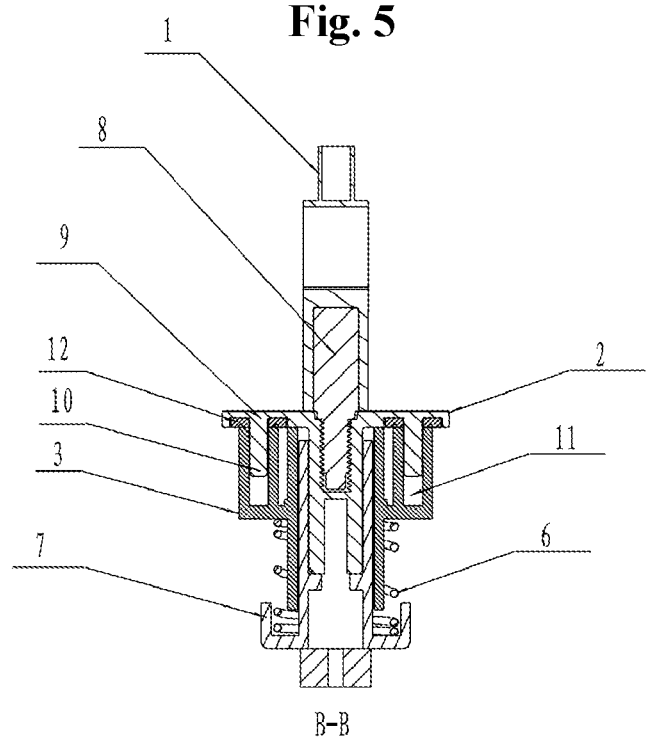
FIG. 5 is a schematic cross-sectional view along line B-B of the air-releasing valve shown in FIG. 3.

FIGS. 4 and 5 are schematic cross-sectional views along lines A-A and B-B of the air-releasing valve shown in FIG. 3, respectively. As shown in FIGS. 4 and 5, the air-releasing valve pull ring 1 is connected with the air-releasing valve holder 2 via the air-releasing valve pull ring insert 8 which is detachable. Alternatively, the air-releasing valve pull ring 1 and the air-releasing valve holder 2 may be formed integrally. The air-releasing valve holder 2 and the switch cap 7 are fixedly connected so that the air-releasing valve pull ring 1 and the switch cap 7 are linked in movement. The air-releasing valve holder 2 engages with the air-releasing valve retaining base 3, and the switch cap 7 is positioned to be embedded at least partially into the air-releasing valve retaining base 3. To be specific, the main body of the air-releasing valve holder 2 is embedded into the air-releasing valve retaining base 3, with a gap therebetween for partially inserting the switch cap 7 to be fixedly connected with the air-releasing valve holder 2. The air-releasing valve holder 2 has an outer edge 9 on the top end thereof, and both ends of the outer edge 9 extend downwards to form two guide pillars 10. Below the guide pillars 10, the air-releasing valve retaining base 3 has two air-releasing holes 11 corresponding to the guide pillars. The diameter of the guide pillars 10 is smaller than that of the air-releasing holes 11. The two guide pillars 10 are inserted into the respective air-releasing holes 11. Sealing gaskets 12 for sealing the air-releasing holes 11 are further provided on a surface of the outer edge 9 facing the air-releasing holes 11. The air-releasing valve spring 6 is installed between the air-releasing valve retaining base 3 and the switch cap 7 and is in a compressed state normally. Under the elastic force of the air-releasing valve spring, the switch cap 7 is applied with a downward force. Since the switch cap 7 is fixedly connected with the air-releasing valve holder 2, the air-releasing valve holder 2 is also applied with a downward force, and thus abuts against the air-releasing valve retaining base 3. Meanwhile, the guide pillars 10 at both ends of the air-releasing valve holder 2 are also applied with a downward force so that the outer edge 9 of the air-releasing valve holder presses against the air-releasing valve sealing gaskets 12 accurately. By the air-releasing valve sealing gaskets 12, the air-releasing holes 11 are sealed. Here, the guide pillars 10 have a function for position limitation. At this time, the air-releasing holes 11 are in a sealed state, and the air-releasing valve is closed.

Figure 6:
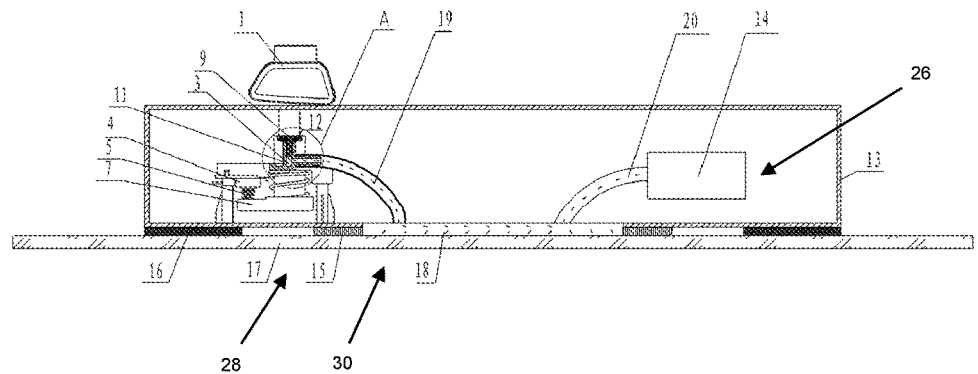
FIG. 6 is a schematic cross-sectional view along line C-C of the air-releasing valve shown in FIG. 3 when a suction type suction robot is in operation.
Figure 7:
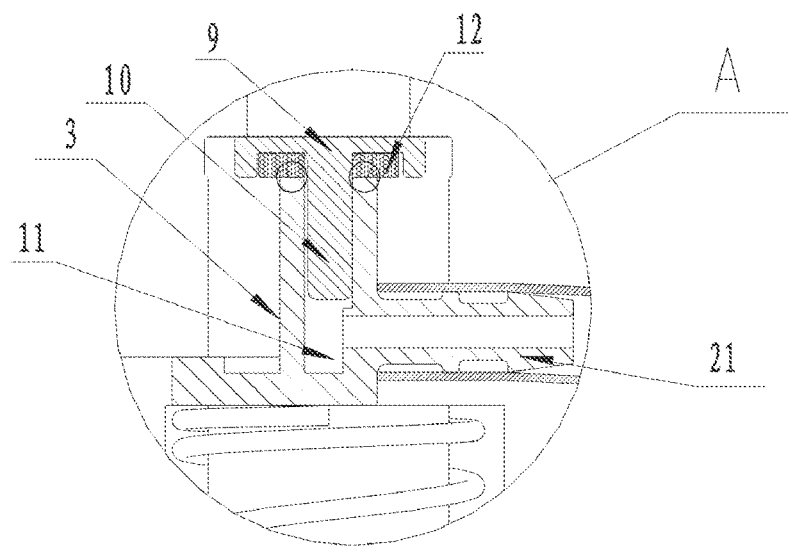
FIG. 7 is an enlarged view of a part A of the suction type suction robot shown in FIG. 6.

FIG. 6 is a schematic cross-sectional view along line C-C of the air-releasing valve shown in FIG. 3 when the suction type suction robot is in operation, in which the air-releasing valve is in a closed state. FIG. 7 is an enlarged view of a part A of the suction type suction robot shown in FIG. 6.

Figure 8:
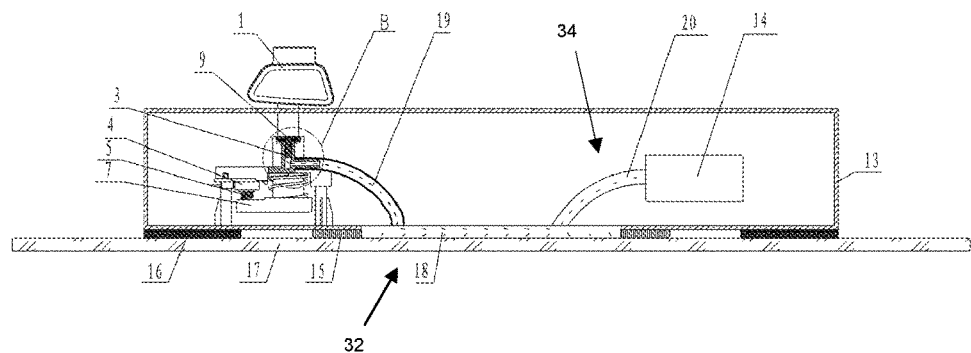
FIG. 8 is a schematic cross-sectional view along C-C of the air-releasing valve shown in FIG. 3 when air is released from the suction type suction robot.
Figure 9:
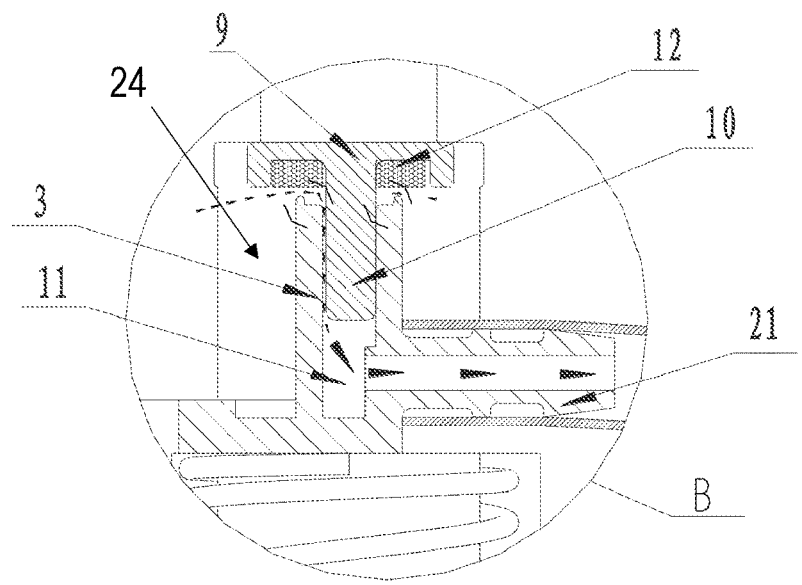
FIG. 9 is an enlarged view of a part B of the robot shown in FIG. 8.

FIG. 8 is a schematic cross-sectional view along line C-C of the air-releasing valve shown in FIG. 3 when air is released from the suction type suction robot, and FIG. 9 is an enlarged view of a part B of the robot shown in FIG. 8.

FIGS. 6 and 8 show a suction robot having the air-releasing valve as described above, and the cross-sectional direction thereof is the direction along the line C-C of the air-releasing valve shown in FIG. 3. As shown in FIGS. 6 and 8, the robot has a case 13, the air-releasing valve and a vacuuming apparatus 14 which are inside the case 13, driving wheels 15, duster clothes 16, a negative pressure chamber 18, hoses 19 connecting the negative pressure chamber 18 and the air-releasing valve, and a hose 20 connecting the negative pressure chamber 18 and the vacuuming apparatus 14. Further, the robot comprises a control unit 26 and a driving unit 30 which are not shown in the drawings. The robot is provided with a suction cup 32 at the bottom thereof. The space surrounded by the suction cup, the bottom surface of the robot and the surface to be worked form the negative pressure chamber 18. The suction cup 32 and the vacuuming apparatus 14 form a suction unit 34. The driving wheels form a walking unit 28 which is driven by the driving unit. The air-releasing valve is connected with the suction cup. To be specific, the communication between the air-releasing valve and the negative pressure chamber 18 is achieved by connecting the hoses 19 with gas guiding joints 21 on the air-releasing valve retaining base 3. The gas guiding joints 21 are in communication with the air-releasing holes 11. The switch 4 is connected with the control unit which is connected with the vacuuming apparatus 14.

During operation, the robot is attached on a glass 17, and then the vacuuming apparatus 14 is powered on. Since the air-releasing valve is in a closed state normally, air cannot flow through the air-releasing valve (as shown in FIG. 7), and the negative pressure chamber 18 is only in communication with the vacuuming apparatus 14. At this time, the vacuuming apparatus 14 can pump air out of the negative pressure chamber 18 to form a negative pressure so that the robot is adsorbed on the glass and will not fall.

When the robot needs air release (as shown in FIG. 8), the air-releasing valve pull ring 1 is pulled up, and then drives and lifts up the air-releasing valve holder 2. Then, the sealing function of the sealing gaskets 12 is deactivated to allow the air-releasing valve to release air (as shown in FIG. 9). Air flows into the hose 19 through the air-releasing holes 11, and then flows into the negative pressure chamber 18 to release air from the suction cup. When the air-releasing valve pull ring 1 is pulled up, due to the movement linkage between the air-releasing valve pull ring 1 and the switch cap 7, the switch cap 7 is lifted up, and the switch spring 5 is compressed. When the switch spring is compressed to a certain extent, the switch 4 is triggered (see FIG. 4) so that the switch 4 generates and transmits a switching signal to the control unit so as to shut off the vacuuming apparatus 14. When the air pressure of the negative pressure chamber 18 becomes in balance with external atmospheric pressure, the robot loses its adsorption capacity and can be taken off smoothly. Since the vacuuming apparatus is shut off at the time of air release, not only can air be released from the suction robot quickly, but also energy is saved.

After the air release is completed, the air-releasing valve pull ring 1 is released, and under the action of the air-releasing valve spring 6, the air-releasing valve returns back to its normal state, i.e., the closed state.

As described above, in the present invention, the air-releasing valve can shut off the vacuuming apparatus while releasing air from the suction robot, thereby enabling a quick air release of the robot and an easy take-off of the robot from the window.

Hereinbefore, the present invention is described in combination with only one specific embodiment in which the switch 4 is a pressure sensing switch. However, in addition to the pressure sensing switch, the switch may be other sensing switches including limit switch, Hall switch and the like. The specific implementation form of the activation unit is not limited to the specific embodiment described above. For example, a simple electromagnet mechanism or cam mechanism may be used to open the air-releasing holes for air release and trigger the switch to shut off the vacuuming apparatus of the suction apparatus simultaneously.

Therefore, the present invention provides an air-releasing valve for a suction apparatus, comprising an activation unit 22 and an air-releasing unit 24, wherein the air-releasing unit 24 has an air-releasing hole in communication with a negative pressure chamber of the suction apparatus. By the activation unit, the air-releasing hole is opened for air release and a vacuuming apparatus of the suction apparatus is shut off simultaneously. Specifically, if the activation unit comprises an interaction unit (e.g., a button, a touch screen and a voice input device) provided on a case of the suction robot. When the user operates the interaction unit, the control unit controls the air-releasing hole to be opened for air release and meanwhile controls the vacuuming apparatus to be shut off (for example, the electromagnet mechanism or the cam mechanism is controlled to open the air-releasing hole for air release and directly disconnect the power supply circuit of the vacuuming apparatus simultaneously).

Correspondingly, the present invention further provides a suction robot comprising a control unit, a driving unit, a suction unit and a walking unit. The control unit is connected with the driving unit. The driving unit drives the walking unit. The suction unit comprises a suction cup and a vacuuming apparatus which is connected with the control unit. The vacuuming apparatus pumps air out of the suction cup to form a negative pressure chamber so that the suction robot is adsorbed on the working surface. Further, the suction robot comprises the above air-releasing valve connected with the suction cup, and the control unit is connected with the activation unit.

In addition, the control signal may not be transmitted to the control unit, and an electric current of the vacuuming apparatus may be cut off directly via a cut-out switch and/or the activation unit so as to shut off the vacuuming apparatus.

In the above embodiment, two gas guiding joints 21 are provided, which may be connected with the same one negative pressure chamber 18 to shorten the air release time. As to a dual-body robot, the two gas guiding joints may be connected with the front and rear negative pressure chambers of the robot, respectively. That is, air is released from both the front case and the rear case via one air-releasing valve.

The invention claimed is:

1. An air-releasing valve for a suction apparatus, comprising an activation unit and an air-releasing unit, the air-releasing unit having an air-releasing hole in communication with a negative pressure chamber of the suction apparatus, characterized in that,
   by the activation unit, the air-releasing hole is opened for air release and a vacuuming apparatus of the suction apparatus is shut off simultaneously.

2. The air-releasing valve for the suction apparatus of claim 1, characterized in that,
   the air-releasing unit comprises an air-releasing valve retaining base,
   the air-releasing hole is located on the air-releasing valve retaining base and is in communication with the negative pressure chamber of the suction apparatus,
   the activation unit is provided on the air-releasing valve retaining base and is movable relative to the air-releasing valve retaining base so as to open or close the air-releasing hole.

3. The air-releasing valve for the suction apparatus of claim 2, characterized in that,
   a switch is further provided on the air-releasing valve retaining base,
   when air release is needed, the activation unit moves relative to the air-releasing valve retaining base under an external force, so that it opens the air-releasing hole and triggers the switch to shut off the vacuuming apparatus of the suction apparatus simultaneously.

4. The air-releasing valve for the suction apparatus of claim 3, characterized in that,
   the air-releasing valve further comprises a switch cap connected with the activation unit,
   a switch spring is provided between the switch and the switch cap, the activation unit triggers the switch via the switch cap to shut off the vacuuming apparatus of the suction apparatus.

5. The air-releasing valve for the suction apparatus of claim 4, characterized in that,
the activation unit comprises an air-releasing valve pull ring, an air-releasing valve pull ring insert and an air-releasing valve holder,
the air-releasing valve pull ring is connected with the air-releasing valve holder via the air-releasing valve pull ring insert which is detachable,
the air-releasing valve holder is connected with the switch cap.

6. The air-releasing valve for the suction apparatus of claim 5, characterized in that, an air-releasing valve spring is provided between the switch cap and the air-releasing valve retaining base.

7. The air-releasing valve for the suction apparatus of claim 6, characterized in that,
the air-releasing valve holder has on a top end thereof an outer edge which extends downward to form a guide pillar corresponding to the air-releasing hole,
the diameter of the guide pi is smaller than that of the air-releasing hole,
a sealing gasket is provided on the outer edge,
the air-releasing valve holder engages with the air-releasing valve retaining base, and they abut against each other under the action of the air-releasing valve spring.

8. The air-releasing valve for the suction apparatus of claim 7, characterized in that, a gas guiding joint in communication with the air-releasing hole is provided on the air-releasing valve retaining base, and the gas guiding joint is connected with the negative pressure chamber via a hose.

9. The air-releasing valve for the suction apparatus of claim 3, characterized in that, the switch is a sensing switch, which transmits a switching signal to a control unit of the suction apparatus to shut off the vacuuming apparatus when the air-releasing valve releases air.

10. The air-releasing valve for the suction apparatus of claim 9, characterized in that, the sensing switch is a limit switch, a Hall switch, or a pressure sensing switch.

11. The air-releasing valve for the suction apparatus of claim 3, characterized in that, the switch is a cut-out switch, which cuts off an electric current of the vacuuming apparatus when the activation unit is pulled up for air release.

12. A suction robot comprising a control unit, a driving unit, a suction unit and a walking unit, the control unit being connected with the driving unit, the driving unit driving the walking unit, and the suction unit comprising a suction cup and a vacuuming apparatus,
wherein the vacuuming apparatus is connected with the control unit, the vacuuming apparatus pumps air out of the suction cup to form a negative pressure chamber so that the suction robot is adsorbed on a working surface,
characterized in that, further comprising the air-releasing valve according to claim 1.

13. The suction robot of claim 12, characterized in that, the control unit is connected with the activation unit.

\* \* \* \* \*